United States Patent
Yawata et al.

(10) Patent No.: US 11,552,300 B2
(45) Date of Patent: Jan. 10, 2023

(54) ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Toshihiko Yawata, Kanagawa (JP); Hiroaki Mochizuki, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 347 days.

(21) Appl. No.: 16/945,941

(22) Filed: Aug. 3, 2020

(65) Prior Publication Data

US 2020/0365900 A1 Nov. 19, 2020

Related U.S. Application Data

(63) Continuation of application No. PCT/JP2019/011143, filed on Mar. 18, 2019.

(30) Foreign Application Priority Data

Mar. 28, 2018 (JP) .............................. JP2018-062757

(51) Int. Cl.
*H01M 4/64* (2006.01)
*H01M 4/62* (2006.01)
(Continued)

(52) U.S. Cl.
CPC ............. *H01M 4/64* (2013.01); *H01M 4/623* (2013.01); *H01M 10/0562* (2013.01); *H01M 2004/021* (2013.01); *H01M 2004/028* (2013.01)

(58) Field of Classification Search
None
See application file for complete search history.

(56) References Cited

U.S. PATENT DOCUMENTS 9,455,471 B2  9/2016  Yoshida
2010/0291442 A1  11/2010  Wang et al.
(Continued)

FOREIGN PATENT DOCUMENTS

JP  H10144298  5/1998
JP  2003257433  9/2003
(Continued)

OTHER PUBLICATIONS

"International Search Report (Form PCT/ISA/210) of PCT/JP2019/011143," dated May 21, 2019, with English translation thereof, pp. 1-5.
(Continued)

*Primary Examiner* — Ula C Ruddock
*Assistant Examiner* — Tony S Chuo
(74) *Attorney, Agent, or Firm* — JCIPRNET

(57) ABSTRACT

Provided are an electrode sheet for an all-solid state secondary battery and an all-solid state secondary battery including the electrode sheet. The electrode sheet includes a current collector, a primer layer, and an electrode active material layer in this order,
in which the electrode active material layer includes an inorganic solid electrolyte having ion conductivity of a metal belonging to Group 1 or Group 2 in the periodic table, an active material, and a binder a1,
the primer layer includes the binder a1 and a binder a2, and
in a case where the primer layer is equally divided into six sub-layers in a thickness direction and the six sub-layers are set as a first sub-layer to a sixth sub-layer in order from the electrode active material layer side toward the current collector side, a relationship between a ratio B1 of a content of a1 to a total content
(Continued)

of a1 and a2 in the first sub-layer and a ratio B6 of a content of a1 to a total content of a1 and a2 in the sixth sub-layer satisfies B1>B6.

10 Claims, 1 Drawing Sheet

(51) Int. Cl.
*H01M 10/0562* (2010.01)
*H01M 4/02* (2006.01)

(56) References Cited

U.S. PATENT DOCUMENTS

2013/0157143 A1 6/2013 Hoshiba et al.
2017/0301949 A1 10/2017 Mimura et al.

FOREIGN PATENT DOCUMENTS

| JP | 2011501383 | 1/2011 |
| JP | 2013125707 | 6/2013 |
| WO | 2013146916 | 10/2013 |
| WO | 2016129426 | 8/2016 |

OTHER PUBLICATIONS

"Written Opinion of the International Searching Authority (Form PCT/ISA/237) of PCT/JP2019/011143," dated May 21, 2019, with English translation thereof, pp. 1-7.

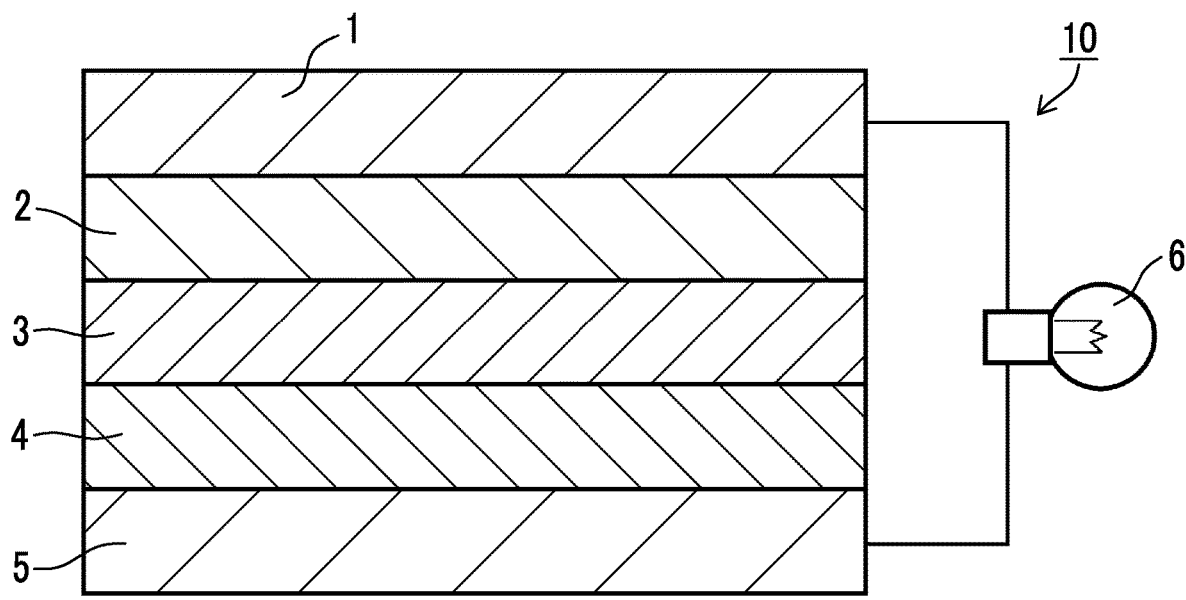

ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2019/011143 filed on Mar. 18, 2019, which claims priority under 35 U.S.C. § 119 (a) to Japanese Patent Application No. 2018-062757 filed in Japan on Mar. 28, 2018. Each of the above applications is hereby expressly incorporated by reference, in its entirety, into the present application.

BACKGROUND OF THE INVENTION

1. Field of the Invention

The present invention relates to an electrode sheet for an all-solid state secondary battery and an all-solid state secondary battery.

2. Description of the Related Art

A lithium ion secondary battery is a storage battery including a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that short-circuit and ignition may be caused in batteries due to overcharging or overdischarging, and there is a demand for additional improvement in reliability and safety.

Under these circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety or reliability which is considered as a problem of batteries in which the organic electrolytic solution is used can be significantly improved, and it also becomes possible to extend the service lives. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

Due to the above-described advantageous effects, all-solid state secondary batteries have been developed as the next-generation lithium ion batteries. For example, WO2013/146916A describes an electrode for an all-solid state secondary battery having a structure in which a current collector and an electrode mixture layer (electrode active material layer) are laminated through a conductive adhesive layer (primer layer), the electrode mixture layer including an inorganic solid electrolyte having a sulfur atom and an active material, the conductive adhesive layer consisting of a diene polymer and conductive particles, and the diene polymer including a specific mass of a diene monomer unit. In the electrode for an all-solid state secondary battery, the sulfur atom included in the inorganic solid electrolyte and a carbon-carbon double bond of the diene polymer form a crosslinked structure such that the peel strength (binding properties between the current collector and the electrode active material layer) is excellent, and an all-solid state secondary battery including the electrode for an all-solid state secondary battery has excellent high temperature cycle characteristics. In addition, WO2016/129426A describes an electrode sheet for an all-solid state secondary battery including an inorganic solid electrolyte, an active material, and an electrode active material layer that includes a polymer having a specific functional group. The electrode sheet for an all-solid state secondary battery has excellent binding properties, and an all-solid state secondary battery including the electrode sheet for an all-solid state secondary battery has excellent ion conductivity.

SUMMARY OF THE INVENTION

For an all-solid state secondary battery, characteristics (cycle characteristics) capable of maintaining a constant discharge capacity even after repeated charging and discharging are required. In addition, characteristics (discharge load characteristics) capable of realizing a desired discharge capacity at a low resistance even in a case where discharging is performed at a high current value are required. Further, assuming a real usage environment, characteristics (vibration resistance) capable of maintaining battery performance even in a vibration environment are also important. The present inventors conducted an investigation on the battery configurations in the related art including the techniques described in WO2013/146916A and WO2016/129426A and found that adhesiveness between a current collector and an electrode active material layer deteriorates due to repeated expansion and contraction of an active material during charging and discharging, peeling is likely to occur between the current collector and the electrode active material layer, and thus it is difficult to realize the above-described characteristics at a desired high level.

Therefore, an object of the present invention is to provide an all-solid state secondary battery having excellent cycle characteristics, discharge load characteristics, and vibration resistance. In addition, another object of the present invention is to provide an electrode sheet that is suitable as a constituent material of the all-solid state secondary battery.

The present inventors conducted a thorough investigation assuming that the maintaining of adhesiveness between a current collector and an electrode active material layer during battery operation is an important factor for improving the above-described characteristics at a desired level. As a result, it was found that the above-described objects can be achieved by providing a primer layer between the current collector and the electrode active material layer to improve adhesiveness between the current collector and the electrode active material layer and adding a binder included in the electrode active material layer to the primer layer such that a content of the binder in the vicinity of an interface between the primer layer and the electrode layer is higher than a content of the binder in the vicinity of an interface between the primer layer and the current collector. The present invention has been completed based on the above findings as a result of repeated investigation.

That is, the above-described objects have been achieved by the following means.

[1] An electrode sheet for an all-solid state secondary battery comprising a current collector, a primer layer, and an electrode active material layer in this order, in which the electrode active material layer includes an inorganic solid electrolyte having ion conductivity of a metal belonging to Group 1 or Group 2 in the periodic table, an active material, and a binder a1, the primer layer includes the binder a1 and a binder a2 different from the binder a1, and in a case where the primer layer is equally divided into six sub-layers in a thickness direction and the six sub-layers are set as a first sub-layer to a sixth sub-layer in order from the electrode active material layer side toward the current collector side, a relationship between a ratio B1 of a content of the binder a1 to a total content of the binder a1 and the binder a2 in the first sub-layer and a ratio B6 of a content of the binder a1 to a total content of the binder a1 and the binder a2 in the sixth sub-layer satisfies B1>B6.

[2] The electrode sheet for an all-solid state secondary battery according to [1], in which a ratio of a content of the binder a1 to a total content of the binder a1 and the binder a2 in each of the sub-layers increases in a direction from the second sub-layer toward the first sub-layer.

[3] The electrode sheet for an all-solid state secondary battery according to [2], in which a ratio of a content of the binder a1 to a total content of the binder a1 and the binder a2 in each of the sub-layers sequentially increases in a direction from the third sub-layer toward the first sub-layer.

[4] The electrode sheet for an all-solid state secondary battery according to any one of [1] to [3], in which a resin forming the binder a1 is a polyamide resin, a polyimide resin, a polyurea resin, a fluorine-containing resin, a hydrocarbon resin, a polyurethane resin, or a (meth)acrylic resin.

[5] The electrode sheet for an all-solid state secondary battery according to [4], in which the binder a2 is a hydrocarbon resin or a hydrocarbon rubber.

[6] The electrode sheet for an all-solid state secondary battery according to any one of [1] to [5], in which a resin forming the binder a1 has at least one of an acidic functional group, a basic functional group, a hydroxy group, a cyano group, an alkoxysilyl group, an aryl group, a heteroaryl group, or a hydrocarbon ring group in which three or more rings are fused.

[7] The electrode sheet for an all-solid state secondary battery according to any one of [1] of [6], in which the binder a1 is formed of resin particles having a particle size of 1 nm to 10 µm.

[8] The electrode sheet for an all-solid state secondary battery according to any one of [1] to [7], in which the electrode active material layer is a positive electrode active material layer.

[9] The electrode sheet for an all-solid state secondary battery according to any one of [1] to [8], in which the inorganic solid electrolyte is a sulfide-based inorganic solid electrolyte.

[10] An all-solid state secondary battery comprising:

the electrode sheet for an all-solid state secondary battery according to any one of [1] to [9].

In the description of the present invention, numerical ranges represented by "to" include numerical values before and after "to" as lower limit values and upper limit values.

In the description of the present invention, the description relating to a content, a ratio, and a content ratio are represented by mass unless specified otherwise.

In the all-solid state secondary battery according to an aspect of the present invention, cycle characteristics, discharge load characteristics, and vibration resistance are excellent. In addition, by using the electrode sheet for an all-solid state secondary battery according to an aspect of the present invention as a constituent material of an all-solid state secondary battery, the obtained all-solid state secondary battery can be made to have excellent cycle characteristics, discharge load characteristics, and vibration resistance.

BRIEF DESCRIPTION OF THE DRAWINGS

FIG. 1 is a vertical cross-sectional view schematically illustrating an all-solid state secondary battery according to a preferred embodiment of the present invention.

DESCRIPTION OF THE PREFERRED EMBODIMENTS

A preferred embodiment of the present invention will be described in order from an electrode sheet for an all-solid state secondary battery according to the present invention.

[Electrode Sheet for All-Solid State Secondary Battery]

An electrode sheet for an all-solid state secondary battery (hereinafter, also simply referred to as "electrode sheet") according to an embodiment of the present invention has a structure in which a current collector and an electrode active material layer are laminated through a primer layer. The electrode active material layer includes an inorganic solid electrolyte having ion conductivity of a metal belonging to Group 1 or Group 2 in the periodic table, an electrode active material (hereinafter, simply referred to as "active material"), and a binder.

The primer layer includes the same binder as the binder included in the electrode active material layer (in the present invention, the binder that is commonly included in both the electrode active material layer and the primer layer will be referred to as "binder a1"). In addition, this primer layer also includes a binder different from the binder a1 (hereinafter, referred to as "binder a2"). In the present invention, the binders a1 and a2 are binders formed of a desired one kind of resin.

In the present invention, in a case where the primer layer is equally divided into six sub-layers in a thickness direction and the six sub-layers are set as a first sub-layer to a sixth sub-layer in order from the electrode active material layer side toward the current collector side, a relationship between a ratio B1 of a content of the binder a1 to a total content of the binder a1 and the binder a2 in the first sub-layer and a ratio B6 of a content of the binder a1 to a total content of the binder a1 and the binder a2 in the sixth sub-layer satisfies B1>B6.

In a case where the active material included in the electrode active material layer is a positive electrode active material, the electrode active material layer is a positive electrode active material layer and is combined with a positive electrode current collector to function as a positive electrode layer. In addition, in a case where the active material included in the electrode active material layer is a negative electrode active material, the electrode active material layer is a negative electrode active material layer and is combined with a negative electrode current collector to function as a negative electrode layer.

<Current Collector (Metal Foil)>

The positive electrode current collector and the negative electrode current collector are typically electron conductors.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited. For example, the thickness of the current collector can be set to 1 to 500 µm. In addition, it is also preferable that the surface of the current collector is made to be uneven through a surface treatment.

<Electrode Active Material Layer>

In the present invention, the electrode active material layer includes an inorganic solid electrolyte having ion conductivity of a metal belonging to Group 1 or Group 2 in the periodic table, an electrode active material, and a binder a1.

(Inorganic Solid Electrolyte)

The inorganic solid electrolyte forming the electrode active material layer according to the embodiment of the present invention is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, LiFSI, LiCl, and the like). The inorganic solid electrolyte is not particularly limited as long as it has ion conductivity of a metal belonging to Group 1 or Group 2 in the periodic table and generally does not have electron conductivity.

In the present invention, the inorganic solid electrolyte has conductivity of an ion of a metal belonging to Group 1 or Group 2 in the periodic table. The inorganic electrolyte can be appropriately selected from solid electrolyte materials to be applied to this kind of products and used. Representative examples of the inorganic solid electrolyte include (i) a sulfide-based inorganic solid electrolyte and (ii) an oxide-based inorganic solid electrolyte. In the present invention, a more favorable interface can be formed between the active material and the inorganic solid electrolyte. Therefore, a sulfide-based inorganic solid electrolyte is preferably used.

(i) Sulfide-Based Inorganic Solid Electrolyte

The sulfide-based inorganic solid electrolyte is preferably a compound that contains a sulfur atom (S), has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by the following Formula (1).

$$L_{a1}M_{b1}P_{c1}S_{d1}A_{e1} \qquad \text{Formula (I)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. Further, a1 is preferably 1 to 9 and more preferably 1.5 to 7.5. b1 is preferably 0 to 3 and more preferably 0 to 1. Further, d1 is preferably 2.5 to 10 and more preferably 3.0 to 8.5. Further, e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_7S_5$. In a case where the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom (O), has ion conductivity of a metal belonging to Group 1 or Group 2 in the periodic table, and has electron-insulating properties.

Specific examples of the compound include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}{}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}{}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0<yf≤3, 1≤zf≤10), $Li_{xg}S_{yg}O_{zg}$ (1≤xg≤3, 0≤yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$) and LiPON in which some of oxygen atoms in lithium phosphate are substituted with nitrogen atoms, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like). It is also possible to preferably use $LiA^1ON$ ($A^1$ represents at least one element selected from Si, B, Ge, Al, C, Ga, or the like) and the like.

The volume average particle size of the inorganic solid electrolyte is not particularly limited, but is preferably 0.01 μm or more and more preferably 0.1 μm or more. The upper limit is preferably 100 μm or less and more preferably 50 μm or less. The average particle size of the inorganic solid electrolyte particles is measured in the following order. The inorganic solid electrolyte particles are diluted and prepared to 1 mass % of a dispersion liquid by using water (heptane in a case where the inorganic solid electrolyte is unstable in water) in a 20 ml sample bottle. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five specimens are prepared and the average value thereof is adopted.

(Electrode Active Material)

In the present invention, the electrode active material layer may also include the active material capable of intercalating and deintercalating ions of a metal element belonging to Group 1 or Group 2 in the periodic table.

—Positive Electrode Active Material—

The positive electrode active material is preferably capable of reversibly intercalating and deintercalating lithium ions. The above-described material is not particularly limited as long as the material has the above-described characteristics and may be transition metal oxides, organic matters, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (circle-equivalent average particle size) of positive electrode active material particles is not particularly limited. For example, the volume average particle diameter can be set to 0.1 to 50 μm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (circle-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited. The mass can be appropriately determined depending on the designed battery capacity.

The content of the positive electrode active material in the electrode active material layer is not particularly limited, but is preferably 10 to 95 parts by mass, more preferably 30 to 90 parts by mass, still more preferably 50 to 85 parts by mass, and still more preferably 55 to 80 parts by mass with respect to 100 parts by mass of the solid content.

—Negative Electrode Active Material—

The negative electrode active material is preferably capable of reversibly intercalating and deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, carbonaceous materials or a lithium single body is preferable. In addition, the metal composite oxides are preferably capable of intercalating and deintercalating lithium. The material is not particularly limited, but preferably includes titanium and/or lithium as a component from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, scale-like graphite powder, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 20 in case of being measured by an X-ray diffraction method using CuKa rays, and the oxide may have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and Bi, and chalcogenides are particularly preferable. Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4TisOi_2$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

The shape of the negative electrode active material is not particularly limited, but is preferably a particle shape. The average particle size of the negative electrode active material is preferably 0.1 to 60 μm. In order to obtain a predetermined particle size, an ordinary pulverizer or classifier is used. For example, a mortar, a ball mill, a sand mill, a vibration ball mill, a satellite ball mill, a planetary ball mill, a swirling air flow jet mill, a sieve, or the like is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

The chemical formulae of the compounds obtained using a calcination method can be calculated using inductively coupled plasma (ICP) optical emission spectroscopy as a measurement method from the mass difference of powder before and after calcinating as a convenient method.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited. The mass can be appropriately determined depending on the designed battery capacity.

The content of the negative electrode active material in the electrode active material is not particularly limited, but is preferably 10 to 80 parts by mass and more preferably 20 to 80 parts by mass with respect to 100 parts by mass the solid content.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

(Binder a1)

In the present invention, the electrode active material layer includes the binder a1. A constituent material forming the binder a1 is a resin. As the resin forming the binder a1, various organic polymer compounds (polymers) can be used. The binder a1 improves binding properties between solid particles such as inorganic solid electrolyte particles or active material particles and contributes to mechanical strength, ion conductivity, and the like. The organic polymer compound forming the binder may be a particle form or a non-particle form. Preferable examples of the resin forming the binder a1 will be described below.

—Fluorine-Containing Resin—

Examples of a fluorine-containing resin include polytetrafluoroethylene (PTFE), polyvinylene difluoride (PVDF), and a copolymer (PVDF-HFP) of polyvinylene difluoride and hexafluoropropylene.

—Hydrocarbon Resin—

Examples of the hydrocarbon resin include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

—(Meth)Acrylic Resin—

Examples of a (meth)acrylic resin include various (meth)acrylic monomers, (meth)acrylamide monomers, and copolymers of two or more monomers thereof.

In addition, copolymers of vinyl monomers are also be suitably used. Examples of the copolymers include a copolymer of methyl (meth)acrylate and styrene, a copolymer of methyl (meth)acrylate and acrylonitrile, and a copolymer of butyl (meth)acrylate, acrylonitrile, and styrene. However, the copolymers are not limited to these examples. In this specification, the copolymer may be any one of a statistic copolymer or a periodic copolymer and is preferably a random copolymer.

In the description of the present invention, "(meth)acryl" refers to methacryl and/or acryl.

—Other Resins—

Examples of other resins include a polyurethane resin, a polyurea resin, a polyamide resin, a polyimide resin, a polyester resin, a polyether resin, a polycarbonate resin, and a cellulose derivative resin.

Among these, from the viewpoint of further improving binding properties between the solid particles, the resin forming the binder a1 is preferably a polyamide resin, a polyimide resin, a polyurea resin, a fluorine-containing resin, a hydrocarbon resin, a polyurethane resin, or a (meth)acrylic resin and more preferably a (meth)acrylic resin or a fluorine-containing resin.

In addition, it is preferable that the resin forming the binder a1 has at least one of an acidic functional group, a basic functional group, a hydroxy group, a cyano group, an alkoxysilyl group, an aryl group, a heteroaryl group, or a hydrocarbon ring group in which three or more rings are fused.

Examples of the acidic functional group include a carboxylate group (—COOH), a sulfonate group (sulfo group: —$SO_3H$), a phosphate group (phospho group: —$OPO(OH)_2$), a phosphonate group, and a phosphinate group.

Examples of the basic functional group include an amino group, a pyridyl group, an imino group, and an amidine.

The number of carbon atoms in the alkoxysilyl group is preferably 1 to 6, and examples thereof include methoxysilyl, ethoxysilyl, t-butoxysilyl, and cyclohexylsilyl.

The number of carbon atoms forming a ring in the aryl group is preferably 6 to 10, and examples thereof include phenyl and naphthyl. The ring in the aryl group is a monocycle or a ring in which two rings are fused.

The heterocycle in the heteroaryl group is preferably a 4-membered or 10-membered ring, and the number of carbon atoms forming the heterocycle is preferably 3 to 9. Examples of a heteroatom forming the heterocycle include an oxygen atom, a nitrogen atom, and a sulfur atom. Specific examples of the heterocycle include thiophene, furan, pyrrole, and imidazole.

The hydrocarbon ring group in which three or more rings are fused is not particularly limited as long as the hydrocarbon ring is a ring group in which three or more rings are fused. Examples of the fused hydrocarbon ring include a saturated aliphatic hydrocarbon ring, an unsaturated aliphatic hydrocarbon ring, and an aromatic hydrocarbon ring (benzene ring). The hydrocarbon ring is preferably a 5-membered ring or a 6-membered ring.

The hydrocarbon ring group in which three or more rings are fused is preferably a ring group in which three or more rings including at least one aromatic hydrocarbon ring are fused or a ring group in which three or more saturated aliphatic hydrocarbon rings or three or more unsaturated aliphatic hydrocarbon rings are fused.

The number of rings to be fused is not particularly limited and is preferably 3 to 8 and more preferably 3 to 5.

The ring group in which three or more rings including at least one aromatic hydrocarbon ring are fused is not particularly limited, and examples thereof include a ring group including anthracene, phenanthracene, pyrene, tetracene, tetraphene, chrysene, triphenylene, pentacene, pentaphene, perylene, benzopyrene, coronene, anthanthrene, corannulene, ovalene, graphene, cycloparaphenylene, polyparaphenylene, or cyclophene.

The ring group in which three or more saturated aliphatic hydrocarbon rings or three or more unsaturated aliphatic hydrocarbon rings are fused is not particularly limited, and examples thereof include a ring group formed of a compound having a steroid skeleton. Examples of the compound having a steroid skeleton include a ring group formed of a compound of cholesterol, ergosterol, testosterone, estradiol, aldosterone, hydrocortisone, stigmasterol, thymosterol, lanosterol, 7-dehydrodesmosterol, 7-dehydrocholesterol, cholanic acid, cholic acid, lithocholic acid, deoxycholic acid, sodium deoxycholate, lithium deoxycholate, hyodeoxycholic acid, chenodeoxycholic acid, ursodeoxycholic acid, dehydrocholic acid, phocaecholic acid, or hyocholic acid.

As the hydrocarbon ring group in which three or more rings are fused, a ring group formed of a compound having a cholesterol ring structure or a pyrenyl group is more preferable.

The above-described functional group interacts with the solid particles such as the inorganic solid electrolyte and/or the active material to improve adsorption between the particles and the binder a1. The interaction is not particularly limited, and examples thereof include an interaction by a hydrogen bond, an interaction by an acid-base ionic bond, an interaction by a covalent bond, a $\pi$-$\pi$ interaction by an aromatic ring, and a hydrophobic-hydrophobic interaction. The solid particles and the binder a1 adsorb to each other due to one or two or more among the above-described interactions depending on the kind of the functional group and the kind of the above-described particles.

In a case where the functional group interacts, as described above, the chemical structure of the functional group may or may not change. For example, in the above-described $\pi$-$\pi$ interaction or the like, typically, the functional group maintains the structure thereof without a change. On the other hand, in the interaction by a covalent bond or the like, typically, the functional group is converted into an anion (the functional group changes) by desorption of active hydrogen such as a carboxylate group and is bonded to the inorganic solid electrolyte.

The binder a1 is preferably a particle form. In this case, the particle size of the binder a1 is preferably 1 nm to 10 μm, more preferably 1 nm to 500 nm, and still more preferably 10 nm to 400 nm.

The particle size of the particle binder refers to an average particle size and can be calculated using the following method.

The particle binder is diluted using any dispersion medium (a dispersion medium used for preparing the solid electrolyte composition, for example, heptane) in a 20 mL sample bottle to prepare 1 mass % of a dispersion liquid. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. The obtained volume average particle size is set as the particle size. Other detailed conditions and the like can be found in JIS Z8828: 2013 "Particle Size Analysis-Dynamic Light Scattering" as necessary. For each level, five specimens are prepared and measured, and the average value thereof is adopted.

The mass average molecular weight of the resin forming the binder a1 is preferably 5,000 or higher and lower than 5,000,000, more preferably 5,000 or higher and lower than 500,000, and still more preferably 5,000 or higher and lower than 100,000.

The upper limit of the glass transition temperature of the resin forming the binder a1 is preferably 80° C. or lower, more preferably 50° C. or lower, and still more preferably 30° C. or lower. The lower limit is not particularly limited and is generally −80° C. or higher.

The above-described various resins are commercially available. In addition, the binder resin particles or the polymer forming the binder resin particles can also be prepared using an ordinary method.

The above-described organic polymer compound is merely exemplary, and the binder a1 according to the embodiment of the present invention is not limited to this configuration.

The content of the binder a1 in the electrode active material layer is preferably 0.01 mass % or higher, more preferably 0.1 mass % or higher, and still more preferably 0.5 mass % or higher with respect to the electrode active material layer from the viewpoint of simultaneously achieving the binding properties with solid particles and the ion conductivity. From the viewpoint of battery characteristics, the upper limit is preferably 20 mass % or lower, more preferably 10 mass % or lower, still more preferably 7 mass % or lower, and still more preferably 3 mass % or lower with respect to the solid components forming the electrode active material layer.

In the electrode active material layer according to the embodiment of the present invention, a mass ratio of the total content of the inorganic solid electrolyte and the active material to the content of the binder a1 [(Content of Inorganic Solid Electrolyte +Content of Active Material)/(Content of Binder a1)] is preferably in a range of 1,000 to 1. This mass ratio is more preferably 500 to 2 and still more preferably 100 to 10.

As the binder of the electrode active material layer, only the binder a1 may be included or another binder other than the binder a1 may be included. The ratio of the content of the binder a1 to the total content of the binder in the electrode active material layer is preferably 50 mass % or higher, more preferably 70 mass % or higher, still more preferably 80 mass % or higher, and still more preferably 90 mass % or higher. In addition, it is also preferable that all the binders in the electrode active material layer are the binder a1.

(Dispersant)

The electrode active material layer according to the embodiment of the present invention may include a dispersant. In a case where the content of any one of the electrode active material or the inorganic solid electrolyte is high and/or in a case where the particle size of the electrode active material and the inorganic solid electrolyte is small such that the surface area increases, by adding the dispersant, the aggregation thereof can be suppressed, and the electrode active material layer and the solid electrolyte layer can be uniformly formed. As the dispersant, a dispersant that is generally used for an all-solid state secondary battery can be appropriately selected and used. Generally, a compound intended for particle adsorption and steric repulsion and/or electrostatic repulsion is preferably used.

(Lithium Salt)

The electrode active material layer according to the embodiment of the present invention may include a lithium salt.

The lithium salt is not particularly limited, and, for example, a lithium salt described in paragraphs "0082" to "0085" of JP2015-088486A is preferable.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

(Ionic Liquid)

The electrode active material layer according to the embodiment of the present invention may include an ionic liquid in order to further improve the ion conductivity. The ionic liquid is not particularly limited, but is preferably an ionic liquid dissolving the above-described lithium salt from the viewpoint of effectively improving the ion conductivity.

(Conductive Auxiliary Agent)

The electrode active material layer according to the embodiment of the present invention may include a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

The thickness of the electrode active material layer is preferably 10 μm to 500 μm, more preferably 20 to 400 μm, and still more preferably 20 to 200 μm.

<Primer Layer>

The primer layer functions as an adhesive layer for improving adhesiveness between the current collector and the electrode active material layer. The primer layer is not particularly limited as long as it includes the binder a1 and the binder a2 other than the binder a1 and has electrical conductivity.

(Conductive Material)

As the conductive material, for example, the above-described conductive auxiliary agent can be used.

The total content of the conductive material is preferably 2% to 50 mass %, more preferably 4% to 30 mass %, and still more preferably 5% to 20 mass % with respect to the primer layer.

The thickness of the primer layer preferably is 0.5 to 20 μm and more preferably 1 to 10 μm.

(Binder a2)

The binder a2 is not particularly limited as long as it has affinity to the current collector and has certain affinity to a material (for example, a conductive material) for forming the primer layer. As a constituent material forming the binder a2, for example, a resin material such as a rubber, a thermoplastic elastomer, a hydrocarbon resin, a silicone resin, a (meth)acrylic resin, or a fluororubber can be used.

Specific examples of the rubber include a hydrocarbon rubber (for example, butadiene rubber, styrene-butadiene rubber, acrylonitrile-butadiene rubber, or hydrogenated rubber thereof), a fluororubber (for example, polyvinylene fluoride (PVDF), a copolymer of vinylidene fluoride and hexafluoropropylene, or polytetrafluoroethylene (PTFE)), and a cellulose rubber and an acrylic rubber (for example, acrylic acid ester).

Specific examples of the thermoplastic elastomer include a copolymer of styrene, ethylene, and butylene, an olefin elastomer, a urethane elastomer, an ester elastomer, and an amide elastomer. The elastomer is a resin including a so-called hard segment and a so-called soft segment.

Specific examples of the hydrocarbon resin include styrene-butadiene and polyolefin. The hydrocarbon resin refers to a resin other than a rubber and a thermoplastic elastomer in which at least one component is a hydrocarbon compound component.

Among these, a hydrocarbon resin, a (meth)acrylic resin, a rubber, or a thermoplastic elastomer is preferable, and a hydrocarbon resin, a hydrocarbon rubber, or a (meth)acrylic resin is more preferable.

The binder a2 may be a particle form or a non-particle form in the primer layer.

The mass average molecular weight of the resin forming the binder a2 is preferably 5,000 or higher, more preferably 10,000 or higher, and still more preferably 20,000 or higher. The upper limit is preferably 1,000,000 or lower, more preferably 200,000 or lower, and still more preferably 100,000 or lower.

In the electrode sheet according to the embodiment of the present invention, the binder a1 and the binder a2 are not uniformly present in the primer layer, and a content of the binder a1 in the vicinity of an interface between the primer layer and the electrode layer is higher than a content of the binder a1 in the vicinity of an interface between the primer layer and the current collector. In a case where the primer layer is equally divided into six sub-layers in a thickness direction and the six sub-layers are set as a first sub-layer to a sixth sub-layer in order from the electrode active material layer side toward the current collector side, a relationship between a ratio B1 of a content of the binder a1 to a total content of the binder a1 and the binder a2 in the first sub-layer and a ratio B6 of a content of the binder a1 to a total content of the binder a1 and the binder a2 in the sixth sub-layer satisfies B1 >B6. The primer layer includes the binder a1 and the binder a2 in the above-described distribution such that adhesiveness between the electrode active material layer and the current collector can be effectively improved. The reason is not clear but is presumed to be that the binder a1 present in the vicinity of the interface between the primer layer and the electrode layer interacts with the solid particles of the electrode layer such that the interface between the primer layer and the electrode layer is strengthened and that the binder a2 in the interface between the primer layer and the current collector interacts with the current collector (metal foil) such that the interface between the primer layer and the current collector is strengthened. "B1>B6 being satisfied" includes a configuration in which B6 is 0 (a configuration in which the sixth sub-layer does not include the binder a1).

The content of the binder a1 in the first sub-layer is preferably 0.1% to 10 mass %, more preferably 0.2% to 5 mass %, and still more preferably 0.5% to 3 mass %. In addition, the content of the binder a1 in the sixth sub-layer is preferably 0% to 3 mass %, more preferably 0% to 1 mass %, and still more preferably 0% to 0.5 mass %.

A relationship between the content of the binder a1 in the first sub-layer and the content of the binder a1 in the electrode active material layer in contact with the first sub-layer is not particularly limited. For example, the content of the binder a1 in the first sub-layer may be equal to or lower than the content of the binder a1 in the electrode active material layer.

It is preferable that the primer layer is in a configuration (referred to as "configuration-1") in which a ratio of a content of the binder a1 to a total content of the binder a1 and the binder a2 in each of the sub-layers increases in a direction from the second sub-layer toward the first sub-layer. As a result, adhesiveness between the electrode active material layer and the current collector can be further improved. The reason for this is not clear but is presumed to be that, for example, as compared to a configuration where only the first sub-layer includes the binder a1, the second sub-layer also includes a given amount of the binder a1 such that the primer layer is further strengthened (the same effects can also be obtained in a configuration-2 to a configuration-4).

In the configuration-1, in a case where a ratio of a content of the binder a1 to a total content of the binder a1 and the binder a2 in the first sub-layer is represented by B1 and a ratio of a content of the binder a1 to a total content of the binder a1 and the binder a2 in the second sub-layer is represented by B2, B2/B1 is preferably $1/10<B2/B1<1/1$, more preferably $1/5<B2/B1<1/1.1$, and still more preferably $1/2<B2/B1<1/1.2$.

In the configuration-1, the third sub-layer to the sixth sub-layer may or may not each independently include the binder a1. In addition, in the sub-layers including the binder a1 among the third sub-layer to the sixth sub-layer, a ratio of a content of the binder a1 to a total content of the binder a1 and the binder a2 is preferably lower than B1.

It is more preferable that the primer layer is in a configuration (referred to as "configuration-2") in which a ratio of a content of the binder a1 to a total content of the binder a1 and the binder a2 in each of the sub-layers sequentially increases in a direction from the third sub-layer toward the first sub-layer.

In the configuration-2, a preferable relationship between the ratios B1 and B2 is the same as a preferable relationship in the configuration-1.

In addition, in the configuration-2 a relationship between the ratio B2 and a ratio B3 of a content of the binder a1 to a total content of the binder a1 and the binder a2 in the third sub-layer is preferably $1/10<B3/B2<1/1$, more preferably $1/5<B3/B2<1/1.1$, and still more preferably $1/2<B3/B2<1/1.2$.

In the configuration-2, the fourth sub-layer to the sixth sub-layer may or may not each independently include the binder a1. In addition, in the sub-layers including the binder a1 among the fourth sub-layer to the sixth sub-layer, a ratio of a content of the binder a1 to a total content of the binder a1 and the binder a2 is preferably lower than B1.

It is also preferable that the primer layer is in a configuration (referred to as "configuration-3") in which a ratio of a content of the binder a1 to a total content of the binder a1 and the binder a2 in each of the sub-layers sequentially increases in a direction from the fourth sub-layer toward the first sub-layer.

In the configuration-3, a preferable relationship between the ratios B1 and B2 is the same as a preferable relationship in the configuration-1. A preferable relationship between the ratios B2 and B3 is the same as a preferable relationship in the configuration-2.

In addition, in the configuration-3, a relationship between the ratio B3 and a ratio B4 of a content of the binder a1 to a total content of the binder a1 and the binder a2 in the fourth sub-layer is preferably $1/10<B4/B3<1/1$, more preferably $1/5<B4/B3<1/1.1$, and still more preferably $1/2<B4/B3<1/1.2$.

In the configuration-3, the fifth sub-layer to the sixth sub-layer may or may not each independently include the binder a1. In addition, in the sub-layers including the binder a1 among the fifth sub-layer and the sixth sub-layer, a ratio of a content of the binder a1 to a total content of the binder a1 and the binder a2 is preferably lower than B1.

In addition, it is also preferable that the primer layer is in a configuration (referred to as "configuration-4") in which a ratio of a content of the binder a1 to a total content of the binder a1 and the binder a2 in each of the sub-layers sequentially increases in a direction from the fifth sub-layer toward the first sub-layer.

In the configuration-4, a preferable relationship between the ratios B1 and B2 is the same as a preferable relationship in the configuration-1. A preferable relationship between the ratios B2 and B3 is the same as a preferable relationship in the configuration-2. A preferable relationship between the ratios B3 and B4 is the same as a preferable relationship in the configuration-3.

In addition, in the configuration-4, a relationship between the ratio B4 and a ratio B5 of a content of the binder a1 to a total content of the binder a1 and the binder a2 in the fifth sub-layer is preferably $1/10<B5/B4<1/1$, more preferably $1/5<B5/B4<1/1.1$, and still more preferably $1/2<B5/B4<1/1.2$.

In the configuration-4, the sixth sub-layer may or may not each independently include the binder a1. In a case where the sixth sub-layer includes the binder a1, a relationship between the ratio B5 and a ratio B6 of a content of the binder a1 to a total content of the binder a1 and the binder a2 in the sixth sub-layer is preferably $1/10<B6/B5\leq1/1$, more preferably $1/5<B6/B5\leq1/1.1$, and still more preferably $1/2<B6/B5\leq1/1.1$.

The total content of the binder a1 and the binder a2 in the primer layer is preferably 0.1% to 10 mass % and more preferably 0.5% to 5 mass %. In addition, a mass ratio (binder a1/binder a2) of the content the binder a1 to the content of the binder a2 in the primer layer is preferably 1/500 to 1/10, more preferably 1/400 to 1/20, and still more preferably 1/200 to 1/50.

In addition, the primer layer may include a binder other than the binder a1 and the binder a2. In this case, a ratio of the total content of the binder a1 and the binder a2 to the total content of all the binders in the primer layer is preferably 50 mass % or higher, more preferably 70 mass % or higher, still more preferably 80 mass % or higher, and still more preferably 90 mass % or higher. It is also preferable that the binders in the primer layer consist of the binder a1 and the binder a2.

In the electrode sheet according to the embodiment of the present invention, in a case where two or more binders are present as the binder corresponding to the binder a1, as long as one of the two or more binders as the binder a1 satisfies the regulations of the present invention, this electrode sheet is the electrode sheet according to the embodiment of the present invention. The same shall be applied to the binder a2. Accordingly, in a case where two or more binders corresponding to the binder a1 are present and two or more binders corresponding to the binder a2 are present, as long as a combination of one of the binders corresponding to the binder a1 and one of the binders corresponding to the binder a2 satisfies the regulations of the present invention, this electrode sheet is the electrode sheet according to the embodiment of the present invention.

The content of the binder in each of the layers or the sub-layers can be determined by cutting the primer layer, for example, using SAICAS@ (Surface And Interfacial Cutting Analysis System) and identifying organic components in the cut primer layer by NMR and Raman spectroscopy.

The electrode sheet according to the embodiment of the present invention may include other layers as long as it includes the current collector, the primer layer, and the electrode active material layer. Examples of the other layers include a protective layer and a solid electrolyte layer.

The electrode sheet according to the embodiment of the present invention can be suitably used for an all-solid state secondary battery. The electrode sheet according to the embodiment of the present invention is a sheet suitable for forming an electrode in the all-solid state secondary battery according to the embodiment of the present invention, in which the primer layer and the electrode active material layer are provided on the metal foil as the current collector. The electrode sheet is typically a sheet including the current collector, the primer layer, and the electrode active material layer. Examples of a configuration of the electrode sheet according to the embodiment of the present invention includes: a configuration including the current collector, the primer layer, the electrode active material layer, and the solid electrolyte layer in this order; and a configuration including the current collector, the primer layer, the electrode (positive electrode or negative electrode) active material layer, the solid electrolyte layer, and the electrode (positive electrode or negative electrode) active material layer in this order.

The solid electrolyte layer may have a configuration in which the inorganic solid electrolyte is replaced with the active material in the composition of the electrode active material layer. The thickness of the solid electrolyte layer is preferably 10 µm to 500 µm, more preferably 20 to 400 µm, and still more preferably 20 to 200 µm.

[All-Solid State Secondary Battery]

An all-solid state secondary battery according to the embodiment of the present invention includes the electrode sheet according to the embodiment of the present invention. A specific configuration of the all-solid state secondary battery according to the embodiment of the present invention includes a positive electrode, a negative electrode facing the positive electrode, and a solid electrolyte layer sandwiched between the positive electrode and the negative electrode. The positive electrode includes the positive electrode active material layer on the positive electrode current collector. The negative electrode includes the negative electrode active material layer on the negative electrode current collector. At least one of the positive electrode or the negative electrode is formed using the electrode sheet according to the embodiment of the present invention. In the configuration including the electrode sheet, the primer layer (not shown in FIG. 1) is provided between the current collector and the active material layer.

Hereinafter, a preferred embodiments of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and have a laminated structure. In a case in which the above-described structure is employed, during charging, electrons (e) are supplied to the negative electrode side, and lithium ions (Li$^+$) are accumulated in the negative electrode side. On the other hand, during discharging, the lithium ions (Li$^+$) accumulated in the negative electrode side return to the positive electrode, and electrons are supplied to an operation portion 6. In an example illustrated in the drawing, an electric bulb is employed as the operation portion 6 and is lit by discharging. Although not illustrated in FIG. 1, the primer layer is provided between the negative electrode current collector 1 and the negative electrode active material layer 2 and/or between the positive electrode active material layer 4 and the positive electrode current collector 5.

The respective components included in the positive electrode active material layer 4, the solid electrolyte layer 3, and the negative electrode active material layer 2 may be the same as or different from each other unless specified otherwise.

In this specification, the electrode active material layers (the positive electrode active material layer (hereinafter, also referred to as positive electrode layer") and the negative electrode active material layer (hereinafter, also referred to as "negative electrode layer")) will also be referred to as "active material layer".

In a case where the all-solid state secondary battery having a layer configuration illustrated in FIG. 1 is put into a 2032-type coin case, the all-solid state secondary battery having the layer configuration illustrated in FIG. 1 will be referred to as "laminate for an all-solid state secondary battery", and a battery prepared by putting this laminate for an all-solid state secondary battery into a 2032-type coin case will be referred to as "all-solid state secondary battery", thereby referring to both batteries distinctively in some cases.

In the present invention, a functional layer, a member, or the like may be appropriately sandwiched or disposed between the respective layers of the negative electrode active material layer, the solid electrolyte layer, and/or the positive electrode active material layer or on the outside of the negative electrode current collector and/or the positive electrode current collector. In addition, each of the layers may have a single-layer structure or a multi-layer structure.

[Case]

A basic structure of the all-solid state secondary battery can be prepared by disposing the above-described respective layers. Depending on usages, the all-solid state secondary battery according to the embodiment of the present invention may be used as an all-solid state secondary battery as it is but is sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

<Manufacturing of Electrode Sheet for All-Solid State Secondary Battery>

The electrode sheet for an all-solid state secondary battery according to the embodiment of the present invention can be manufactured using an ordinary method, except that the primer layer has the specific configuration. Hereinafter, specific examples of a method of manufacturing the electrode sheet for an all-solid state secondary battery according to the embodiment of the present invention will be described.

(Preparation of Primer Layer-Forming Composition)

A primer layer-forming composition is prepared by mixing at least the binder a1, the binder a2, and the conductive material in the presence of a solvent to form a slurry or a solution. A plurality of primer layer-forming compositions having different ratios between the amounts of the binder a1 and the binder a2 are prepared.

The mixing can be performed by mixing the binder, the conductive auxiliary agent, and the solvent using various mixing devices. The mixing device is not particularly limited, and examples thereof include a ball mill, a beads mill, a planetary mixer, a blade mixer, a roll mill, a kneader, and a disc mill. The mixing conditions are not particularly limited. However, in a case where a ball mill is used, the inorganic solid electrolyte and the dispersion medium are preferably mixed together at 150 to 700 rpm (rotation per minute) for 1 to 24 hours. After mixing, filtering may be optionally performed.

During the mixing, components such as an antioxidant or a dispersion stabilizer may be mixed.

(Preparation of Electrode-Forming Composition)

Using the same method as that of the primer layer-forming composition, an electrode-forming composition can be prepared by dispersing at least the inorganic solid electrolyte, the active material, and the binder a1 in the presence of a dispersion medium to form a slurry.

(Formation Electrode Sheet)

The primer layer-forming composition is applied to the current collector and is dried to form the primer layer. During the formation of the primer layer, a plurality of primer layer-forming compositions having different ratios between the amounts of the binder a1 and the binder a2 are sequentially applied and dried. As a result, the primer layer satisfying the regulations of the present invention can be formed.

Next, the electrode-forming composition is applied to the primer layer and optionally is heated and dried to form the electrode active material layer.

The formation of the primer layer and the electrode active material layer can be applied to the description regarding the formation each of layers described below.

—Dispersion Medium or Solvent—Specific examples of the dispersion medium or the solvent used for preparing the primer layer-forming composition and the electrode-forming composition are as follows.

Examples of an alcohol compound include methyl alcohol, ethyl alcohol, 1-propyl alcohol, 2-butanol, ethylene glycol, propylene glycol, glycerin, 1,6-hexanediol, 1,3-butanediol, and 1,4-butanediol.

Examples of an ether compound include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol dimethyl ether, dipropylene glycol monomethyl ether, tripropylene glycol monomethyl ether, diethylene glycol monobutyl ether, or diethylene glycol dibutyl ether), dialkyl ether (for example, dimethyl ether, diethyl ether, or dibutyl ether), tetrahydrofuran, and dioxane (including respective isomers of 1,2-, 1,3, and 1,4-).

Examples of an amide compound include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphorictriamide.

Examples of an amino compound include triethylamine, and tributylamine.

Examples of a ketone compound include acetone, methyl ethyl ketone, diethyl ketone, dipropyl ketone, and dibutyl ketone.

Examples of an ester compound include methyl acetate, ethyl acetate, propyl acetate, butyl acetate, pentyl acetate, hexyl acetate, methyl propionate, ethyl propionate, propyl propionate, butyl propionate, methyl butyrate, ethyl butyrate, propyl butyrate, butyl butyrate, pentyl butyrate, methyl valerate, ethyl valerate, propyl valerate, butyl valerate, methyl caproate, ethyl caproate, propyl caproate, and butyl caproate.

Examples of an aromatic compound include benzene, toluene, xylene, and mesitylene.

Examples of an aliphatic compound include hexane, heptane, cyclohexane, methylcyclohexane, octane, pentane, cyclopentane, and cyclooctane.

Examples of a nitrile compound include acetonitrile, propionitrile, and butyronitrile.

Examples of the solvent of the primer layer-forming composition other than the above-described examples include water.

The boiling point of the solvent or the dispersion medium under normal pressure (1 atm) is preferably 50° C. or higher and more preferably 70° C. or higher. The upper limit is more preferably 250° C. or lower and still more preferably 220° C. or lower. As the solvent or the dispersion medium, one kind may be used alone, or two or more kinds may be used in combination.

Hereinabove, the electrode sheet having the three-layer configuration consisting of current collector/primer layer/electrode active material layer has been described. The electrode sheet according to the embodiment of the present invention may have a four-layer configuration consisting of current collector/primer layer/electrode active material layer/solid electrolyte layer or a five-layer configuration consisting of current collector/primer layer/electrode (positive electrode or negative electrode) active material layer/solid electrolyte layer/electrode (negative electrode or positive electrode) active material layer. In this case, the solid electrolyte layer and the electrode active material layer forming the uppermost layer can be formed by dissolving or dispersing the components of each of the layers in a solvent using the above-described layer forming method to prepare a composition and applying this composition.

<Manufacturing of All-solid State Secondary Battery>

The all-solid state secondary battery can be manufactured using an ordinary method except that the electrode sheet according to the embodiment of the present invention is used. For example, the all-solid state secondary battery can be manufactured by laminating required layers on the electrode sheet or combining the electrode sheets according to the embodiment of the present invention to form a laminate required for a battery configuration and optionally pressurizing the laminate. Optionally by sealing the laminate in a case, a desired all-solid state secondary battery can be obtained.

(Formation of Respective layers (Film Formation))

The method for applying the solid electrolyte composition is not particularly limited and can be appropriately selected. Examples thereof include coating (preferably wet-type coating), spray coating, spin coating, dipcoat coating, slit coating, stripe coating, and bar coating.

At this time, the solid electrolyte composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state. In addition, the temperature is not excessively increased, and the respective members of the all-solid state secondary battery are not impaired, which is preferable. Therefore, in the all-solid state secondary battery, excellent total performance can be exhibited, and excellent binding properties can be obtained.

After the application of the respective compositions or after the preparation of the all-solid state secondary battery, the respective layers or the all-solid state secondary battery is preferably pressurized. In addition, the respective layers are also preferably pressurized in a state where they are laminated. Examples of the pressurization method include a method using a hydraulic cylinder pressing machine. The pressure is not particularly limited, but is, generally, preferably in a range of 50 to 1,500 MPa.

In addition, the applied solid electrolyte composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the coating solvent or the dispersion medium is dried in advance or in a state in which the coating solvent or the dispersion medium remains.

The respective compositions may be applied at the same time, and the application, the drying, and the pressing may be carried out simultaneously and/or sequentially. The respective compositions may be applied to separate substrates and then laminated by transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the electrode sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be uniform or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

<Usages of All-Solid State Secondary Battery>

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, and memory cards. Additionally, examples of consumer usages include automobiles (electric vehicles and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with solar batteries.

The all-solid state secondary battery refers to a secondary battery in which the positive electrode, the negative electrode, and the electrolyte are solid. In other words, the all-solid state secondary battery is distinguished from an electrolyte secondary battery in which a carbonate solvent is used as an electrolytic solution. In particular, the present invention has been made assuming an inorganic all-solid state secondary battery. The all-solid state secondary battery is classified into an organic (polymer) all-solid state secondary battery in which a polymer compound such as polyethylene oxide is used as an electrolyte and an inorganic all-solid state secondary battery in which Li—P—S-based glass, LLT, or LLZ is used as an electrolyte. An organic compound can be applied to the inorganic all-solid state secondary battery as a binder or an additive of the positive electrode active material, the negative electrode active material, and the inorganic solid electrolyte without any interference.

The inorganic solid electrolyte is distinguished from the electrolyte (polymer electrolyte) in which a polymer compound functions as an ion conducting medium, and an inorganic compound functions as an ion conducting medium. Specific examples of the inorganic solid electrolyte include Li—P—S-based glass, LLT, and LLZ. The inorganic solid electrolyte itself does not deintercalate cations (Li ions) and has an ion transport function. On the other hand, a material as an ion donor that is added to an electrolytic solution or a solid electrolyte layer and deintercalates cations (Li ions) will be referred to as an electrolyte. This electrolyte will be referred to as "electrolyte salt" or "supporting electrolyte" in order to distinguish from the electrolyte as the ion transport material. Examples of the electrolyte salt include LiTFSI.

"Composition" described in the present invention refers to a mixture in which two or more components are uniformly mixed. This composition is not particularly limited as long as it substantially maintains uniformity, in which aggregation or uneven distribution may occur within a range where the desired effect can be exhibited.

EXAMPLES

Hereinafter, the present invention will be described in more detail using examples, but the present invention is not limited to these examples.

<Synthesis Example of Sulfide-Based Inorganic Solid Electrolyte (Li—P—S-Based)>

As a sulfide-based inorganic solid electrolyte, a Li—P—S-based solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphorus pentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li—P—S-based glass; hereinafter, referred to as Li—P—S) was obtained. The ion conductivity of the obtained Li—P—S-based glass (A-1) was $0.8×10^{-3}$ S/cm.

[Preparation of Solid Electrolyte Composition]

180 zirconia beads having a diameter of 5 mm were put into a 45 mL zirconia container (manufactured by Fritsch Japan Co., Ltd.), and 9.7 g of the Li—P—S-based glass (A-1) synthesized as described above, 0.3 g of PVi)F-HFP (copolymer of vinylidene fluoride and hexafluoropropylene; manufactured by Arkema K.K.) as the binder a1, and 15 g of a heptane/tetrahydrofuran mixed solvent as a dispersion medium were put thereinto. Next, the container was set in a planetary ball mill P-7 (trade name, manufactured by Fritsch Japan Co., Ltd.), and the components were continuously stirred for 2 hours at a temperature of 25° C. and a rotation speed of 300 rpm. This way, a solid electrolyte composition (S-1) was prepared.

[Preparation of Positive Electrode-Forming Composition]

50 zirconia beads having a diameter of 3 mm were put into a 45 mL zirconia container (manufactured by Fritsch Japan Co., Ltd.), and 0.5 g of the solid electrolyte composition (S-1) prepared as described above was added thereto. 4.37 g of a positive electrode active material NMC (111) and 0.09 g of a conductive auxiliary agent A (acetylene black) were added to the container. Next, the container was set in a planetary ball mill P-7 (manufactured by Fritsch Japan Co., Ltd.) and the components were continuously stiffed for 15 minutes at a temperature of 25° C. and a rotation speed of 100 rpm. As a result, a positive electrode-forming composition AS-1 was prepared.

[Preparation of Negative Electrode-Forming Composition]

<Preparation of Negative Electrode-Forming Composition BS-1>

50 zirconia beads having a diameter of 3 mm were put into a 45 mL zirconia container (manufactured by Fritsch Japan Co., Ltd.), and 2.1 g of the solid electrolyte composition (S-1) prepared as described above was added thereto. 3 g of graphite as a negative electrode active material was added. Next, the container was set in a planetary ball mill P-7 (manufactured by Fritsch Japan Co., Ltd.) and the components were continuously stirred for 15 minutes at a temperature of 25° C. and a rotation speed of 100 rpm. As a result, a negative electrode-forming composition BS-1 was prepared.

[Preparation of Primer Layer-Forming Composition]

<Preparation of Composition not including Binder a1>

Styrene-butadiene rubber (SBR) as the binder a2 was dissolved in a toluene solution to prepare a polymer solution having a solid content concentration of 10 mass %. Further, acetylene black as a conductive material was added, the binder a2 and acetylene black were mixed with each other such that binder a2:acetylene black=92:8 (mass ratio), and toluene was added such that the concentration of solid contents was adjusted to 5 mass %. As a primer layer-forming composition (B-a1-0) not including the binder a1 was prepared.

<Preparation-1 of Composition including Binder a1>

SBR as the binder a2 was dissolved in a toluene solution to prepare a polymer solution having a solid content concentration of 10 mass %. Further, the binder a1 was added to the binder a2 such that [binder a2]:[binder a1] =99:1 (mass ratio), and a solution having a solid content concentration of 10 mass % was prepared. Further, acetylene black as a conductive material was added, the binder a2, the binder a1, and acetylene black were mixed with each other such that [binder a2+binder a1]:[acetylene black]=92:8 (mass ratio), and toluene was added such that the concentration of solid contents was adjusted to 5 mass %. As a result, a primer layer-forming composition (B-a1-1) in which a ratio of the content of the binder a1 to the total content of the binders was 1 mass % was prepared.

<Preparation-2 of Composition including Binder a1>

SBR as the binder a2 was dissolved in a toluene solution to prepare a polymer solution having a solid content concentration of 10 mass %. Further, the binder a1 was added to the binder a2 such that [binder a2]:[binder a1]=99.2:0.8 (mass ratio), and a solution having a solid content concentration of 10 mass % was prepared. Further, acetylene black as a conductive material was added, the binder a2, the binder a1, and acetylene black were mixed with each other such that [binder a2+binder a1]:[acetylene black]=92:8 (mass ratio), and toluene was added such that the concentration of solid contents was adjusted to 5 mass %. As a result, a primer layer-forming composition (B-a1-0.8) in which a ratio of the content of the binder a1 to the total content of the binders was 0.8 mass % was prepared.

<Preparation-3 of Composition including Binder a1>

SBR as the binder a2 was dissolved in a toluene solution to prepare a polymer solution having a solid content concentration of 10 mass %. Further, the binder a1 was added to the binder a2 such that [binder a2]:[binder a1]=99.4:0.6 (mass ratio), and a solution having a solid content concentration of 10 mass % was prepared. Further, acetylene black as a conductive material was added, the binder a2, the binder a1, and acetylene black were mixed with each other such that [binder a2+binder a1]:[acetylene black]=92:8 (mass ratio), and toluene was added such that the concentration of solid contents was adjusted to 5 mass %. As a result, a primer layer-forming composition (B-a1-0.6) in which a ratio of the content of the binder a1 to the total content of the binders was 0.6 mass % was prepared.

<Preparation-4 of Composition Including Binder a1>

SBR as the binder a2 was dissolved in a toluene solution to prepare a polymer solution having a solid content concentration of 10 mass %. Further, the binder a1 was added to the binder a2 such that [binder a2]:[binder a1]=99.6:0.4 (mass ratio), and a solution having a solid content concentration of 10 mass % was prepared. Further, acetylene black as a conductive material was added, the binder a2, the binder a1, and acetylene black were mixed with each other such that [binder a2+binder a1]:[acetylene black]=92:8 (mass ratio), and toluene was added such that the concentration of solid contents was adjusted to 5 mass %. As a result, a primer layer-forming composition (B-a1-0.4) in which a ratio of the content of the binder a1 to the total content of the binders was 0.4 mass % was prepared.

<Preparation-5 of Composition Including Binder a1>

SBR as the binder a2 was dissolved in a toluene solution to prepare a polymer solution having a solid content concentration of 10 mass %. Further, the binder a1 was added to the binder a2 such that [binder a2]:[binder a1]=99.8:0.2 (mass ratio), and a solution having a solid content concentration of 10 mass % was prepared. Further, acetylene black as a conductive material was added, the binder a2, the binder a1, and acetylene black were mixed with each other such that [binder a2+binder a1]:[acetylene black]=92:8 (mass ratio), and toluene was added such that the concentration of solid contents was adjusted to 5 mass %. As a result, a primer layer-forming composition (B-a1-0.2) in which a ratio of the content of the binder a1 to the total content of the binders was 0.2 mass % was prepared.

first sub-layer) formed as described above using an applicator (trade name: SA-201, Baker type applicator, manufactured by Tester Sangyo Co., Ltd.). The composition was heated at 80° C. for 1 hour and further heated at 110° C. for 1 hour to dry the positive electrode-forming composition. Next, the laminate was pressurized (180 MPa, 1 minute) while being heated (120° C.) using a heat press machine. As a result, a positive electrode sheet for an all-solid state secondary battery having a three-layer structure of positive electrode active material layer/primer layer/aluminum foil was prepared. The thickness of the positive electrode active material layer was 80 μm. The mass of the positive electrode active material layer was 22 mg per 1 cm$^2$ (excluding the aluminum foil).

This way, a positive electrode sheet according to Example 1-1 was prepared.

Each of positive electrode sheets according to Example 1-2, Example 1-3, Comparative Example 1-1, and Comparative Example 1-2 was prepared using the same method as described above, except that the primer layer-forming composition used for forming each of the sub-layers was changed as shown in the following table.

TABLE 1

| Positive Electrode Layer | Primer Layer (Binder a1: PVDF-HFP) | | | | | | Current Collector |
| --- | --- | --- | --- | --- | --- | --- | --- |
| | First Sub-Layer | Second Sub-Layer | Third Sub-Layer | Fourth Sub-Layer | Fifth Sub-Layer | Sixth Sub-Layer | |
| Example 1-1 | B-a1-1 | B-a1-0.8 | B-a1-0.6 | B-a1-0.4 | B-a1-0.2 | B-a1-0 | |
| Example 1-2 | B-a1-1 | B-a1-0.8 | B-a1-0.6 | B-a1-0.4 | B-a1-0.2 | B-a1-0.2 | |
| Example 1-3 | B-a1-1 | B-a1-0.2 | B-a1-0.4 | B-a1-0.6 | B-a1-0.8 | B-a1-0 | |
| Comparative Example 1-1 | B-a1-0 | B-a1-0 | B-a1-0 | B-a1-0 | B-a1-0 | B-a1-0 | |
| Comparative Example 1-2 | B-a1-1 | B-a1-1 | B-a1-1 | B-a1-1 | B-a1-1 | B-a1-1 | |

[Preparation-1 of Electrode (Positive Electrode) Sheet]

<Formation of Primer Layer>

The primer layer-forming composition (B-a1-0) prepared as described above was applied to an aluminum foil (current collector) using an application bar having a clearance of 50 μm at a bar moving speed that was adjusted such that the thickness after drying was 1 μm. The composition was dried using an oven at 150° C. for 30 minutes to form a sixth sub-layer.

Using the same method as described above, the primer layer-forming composition (B-a1-0.2) was applied to the sixth sub-layer and dried to form a fifth sub-layer.

Using the same method as described above, the primer layer-forming composition (B-a1-0.4) was applied to the fifth sub-layer and dried to form a fourth sub-layer.

Using the same method as described above, the primer layer-forming composition (B-a1-0.6) was applied to the fourth sub-layer and dried to form a third sub-layer.

Using the same method as described above, the primer layer-forming composition (B-a1-0.8) was applied to the third sub-layer and dried to form a second sub-layer.

Using the same method as described above, the primer layer-forming composition (B-a1-1) was applied to the second sub-layer and dried to form a first sub-layer.

This way, a primer layer having a thickness of about 6 μm was formed on the current collector.

<Formation of Positive Electrode Active Material Layer>

The positive electrode-forming composition AS-1 prepared as described above was applied to the primer layer (the Positive electrode sheets (Example 2-1, Example 2-2, Example 2-3, Comparative Example 2-1, and Comparative Example 2-2) having the configurations of the primer layers shown in the following table were prepared using the same method as that of [Preparation-1 of Electrode (Positive Electrode) Sheet], except that acrylic latex prepared as described below was used as the binder a1 instead of PVDF-HFP.

(Preparation of Acrylic Latex)

A macromonomer as a precursor was synthesized as follows.

190 parts by mass of toluene was added to a 1 L three-neck flask equipped with a reflux cooling pipe and a gas introduction coke, nitrogen gas was introduced at a flow rate of 200 mL/min for 10 minutes, and the solution was heated to 80° C. A liquid (the following formula a) prepared in a separate container was added dropwise to the solution for 2 hours and was stirred at 80° C. for 2 hours. Next, 0.2 g of a radical polymerization initiator V-601 (manufactured by Wako Pure Chemical Industries, Ltd.) was further added, and the solution was stirred at 95° C. for 2 hours. 0.025 parts by mass of 2,2,6,6-tetramethylpiperidine-1-oxyl (manufactured by Tokyo Chemical Industry Co., Ltd.), 13 parts by mass of glycidyl methacrylate (manufactured by Wako Pure Chemical Industries, Ltd.), and 2.5 parts by mass of tetrabutylammonium bromide (manufactured by Tokyo Chemical Industry Co., Ltd.) were added to the solution held at 95° C. after stirring, and the solution was stirred at 120° C. for 3 hours. The obtained mixture was cooled to a room temperature and was added to methanol to be precipitated. Precipitates were separated by filtration and were washed with methanol two times. 300 parts of heptane was added to the precipitates to dissolve the precipitates. By removing a part of the obtained solution by distillation under reduced pressure, a solution of a macromonomer M-1 was obtained. The mass average molecular weight was 16,000.

| (Formula α) |
|---|
| Dodecyl methacrylate (manufactured by Wako Pure Chemical Industries, Ltd.) . . . 150 parts by mass |
| Methyl methacrylate (manufactured by Wako Pure Chemical Industries, Ltd.) . . . 59 parts by mass |
| 3-mercaptoisobutyric acid (manufactured by Tokyo Chemical Industry Co., Ltd.) . . . 2 parts by mass |
| V-601 (manufactured by Wako Pure Chemical Industries, Ltd.) . . . 2.0 parts by mass |

160 parts by mass of heptane was added to a 1 L three-neck flask equipped with a reflux cooling pipe and a gas introduction coke, nitrogen gas was introduced at a flow rate of 200 mL/min for 10 minutes, and the solution was heated to 80° C. A liquid (a solution in which 90 parts by mass of hydroxyethyl acrylate A-10 (manufactured by Wako Pure Chemical Industries, Ltd.), 7 parts by mass of acrylic acid (manufactured by Wako Pure Chemical Industries, Ltd.), 41 parts by mass (solid content) of the macromonomer M-1, and 1.4 parts by mass of a radical polymerization initiator V-601 (trade name, manufactured by Wako Pure Chemical Industries, Ltd.) were mixed with each other) prepared in a separate container was added dropwise to the solution for 2 hours and was stirred at 80° C. for 2 hours. Next, 2.0 g of V-601 was further added to the obtained mixture, and the solution was stirred at 90° C. for 2 hours. The obtained solution diluted with heptane to obtain a dispersion liquid of acrylic latex. The mass average molecular weight was 89,000, and the particle size was 200 nm.

obtain a negative electrode-solid electrolyte sheet for an all-solid state secondary battery having a diameter of 12 mm.

The positive electrode sheet prepared as described above was punched to have a diameter of 10 mm, and the positive electrode active material layer side was bonded to the solid electrolyte layer of the negative electrode-solid electrolyte sheet for an all-solid state secondary battery. Further, the laminate was pressurized (450 MPa, 1 minute) while being heated (120° C.) using a heat press machine. This laminate was sealed in a coin case to obtain an all-solid state secondary battery.

Test Example 1 Electrode Binding Properties

Regarding the positive electrode sheet prepared as described above, a bending resistance test using a mandrel tester (according to JIS K5600-5-1) was performed. The positive electrode sheet was cut to prepare a strip-shaped specimen having a width of 50 mm and a length of 100 mm. The positive electrode active material layer surface was set opposite to the mandrel, the specimen was bent using the mandrel having a diameter of 32 mm, and the positive electrode active material layer was observed to check whether or not cracking or fracturing occurred. In a case where cracking or fracturing did not occur, the diameter of the mandrel was gradually reduced to 25, 20, 16,12, 10, 8, 6, 5, 4, 3, and 2 mm, and the maximum value of the diameter of the mandrel at which cracking or fracturing occurred was recorded.

Rank C or higher is an acceptable level.
A: 6 mm or less
B: 8 mm
C: 10 mm
D: 12 mm
E: 16 mm or more

TABLE 2

| | Positive Electrode Layer | Primer Layer (Binder a1: Acrylic Latex) | | | | | |
|---|---|---|---|---|---|---|---|
| | | First Sub-Layer | Second Sub-Layer | Third Sub-Layer | Fourth Sub-Layer | Fifth Sub-Layer | Sixth Sub-Layer | Current Collector |
| Example 2-1 | | B-a1-1 | B-a1-0.8 | B-a1-0.6 | B-a1-0.4 | B-a1-0.2 | B-a1-0 |
| Example 2-2 | | B-a1-1 | B-a1-0.8 | B-a1-0.6 | B-a1-0.4 | B-a1-0.2 | B-a1-0.2 |
| Example 2-3 | | B-a1-1 | B-a1-0.2 | B-a1-0.4 | B-a1-0.6 | B-a1-0.8 | B-a1-0 |
| Comparative Example 2-1 | | B-a1-0 | B-a1-0 | B-a1-0 | B-a1-0 | B-a1-0 | B-a1-0 |
| Comparative Example 2-2 | | B-a1-1 | B-a1-1 | B-a1-1 | B-a1-1 | B-a1-1 | B-a1-1 |

[Preparation of All-Solid State Secondary Battery]

The negative electrode-forming composition BS-1 prepared as described above was applied to a current collector (copper foil) using an applicator and was dried to obtain a negative electrode sheet for an all-solid state secondary battery in which the negative electrode active material layer was formed on the current collector. The solid electrolyte composition prepared as described was applied to the negative electrode sheet using an applicator. By drying the solid electrolyte composition, a negative electrode-solid electrolyte sheet for an all-solid state secondary battery having a three-layer structure of solid electrolyte layer/negative electrode active material layer/copper foil was obtained. This sheet was punched using a 12 mmϕ punching machine to

[Test Example 2] Discharge Load Characteristic Test

Using each of the all-solid state secondary batteries prepared as described above, a charging and discharging cycle of 4.2 V to 3.0 V was repeated four times in an environment of 25° C. at a charge current value of 0.4 mA/cm$^2$ and a discharge current value of 0.4 mA/cm$^2$.

Next, in an environment of 25° C., the battery was charged to 4.2 V at a charge current value of 0.6 mA/cm$^2$ and was discharged to 3.0 V at a discharge current value of 0.6 mA/cm$^2$. Next, the battery was further charged to 4.2 V at a charge current value of 0.6 mA/cm$^2$ and was discharged to 3.0 V at a discharge current value of 6 mA/cm$^2$.

A discharge capacity (i-1) at a discharge current value of 0.6 mA/cm$^2$ and a discharge capacity (i-2) at a discharge current value of 6 mA/cm² were measured, and a discharge capacity retention ratio calculated from the following expression was evaluated based on the following evaluation standards.

Discharge Capacity Retention Ratio (%)=100×(i−2)/(i−1)

—Evaluation Standards of Discharge Load Characteristics—

A: the discharge capacity retention ratio was 71% or higher
B: the discharge capacity retention ratio was 51% to 70%
C: the discharge capacity retention ratio was 31% to 50%
D: the discharge capacity retention ratio was 11% to 30%
E: battery abnormality occurred during the evaluation, or the discharge capacity retention ratio was 0% to 10%

"Battery abnormality" refers to a phenomenon in which a decrease in battery voltage of 0.05 V/sec or higher was observed during charging in a range where the battery voltage was between 3.5 V and 4.2 V during charging, or a phenomenon in which the open-circuit voltage after completion of discharging was 2 V or lower.

As the discharge capacity retention ratio is higher, discharge at a high discharge current value can be efficiently performed at a low resistance.

Test Example 3 Cycle characteristic Test

Using each of the all-solid state secondary batteries prepared as described above, a charging and discharging cycle of 4.2 V to 3.0 V was repeated four times in an environment of 30° C. at a charge current value of 0.5 mA/cm² and a discharge current value of 0.5 mA/cm².

Next, a charging and discharging cycle of 4.2 V to 3.0 V was repeated in an environment of 30° C. at a charge current value of 1.0 mA/cm² and a discharge current value of 1.0 mA/cm².

The discharge capacity in the first cycle and the discharge capacity in the 100-th cycle were measured, and a discharge capacity retention ratio calculated from the following expression was evaluated based on the following evaluation standards.

Discharge Capacity Retention Ratio (%)=100×[Discharge Capacity in 100-th Cycle]/[Discharge Capacity in First Cycle]

—Evaluation standards of Cycle Characteristics—

A: the discharge capacity retention ratio was 71% or higher
B: the discharge capacity retention ratio was 51% to 70%
C: the discharge capacity retention ratio was 31% to 50%
D: the discharge capacity retention ratio was 11% to 30%
E: battery abnormality occurred before 100 cycles, or the discharge capacity retention ratio was 0% to 10%

"Battery abnormality" refers to a phenomenon in which a decrease in battery voltage of 0.05 V/sec or higher was observed during charging in a range where the battery voltage was between 3.5 V and 4.2 V during charging, or a phenomenon in which the open-circuit voltage after completion of discharging was 2 V or lower.

Test Example 4 Vibration Resistance Test

Using each of the all-solid state secondary batteries prepared as described above, a charging and discharging cycle of 4.2 V to 3.0 V was repeated four times in an environment of 30° C. at a charge current value of 0.5 mA/cm² and a discharge current value of 0.5 mA/cm².

Next, a charging and discharging cycle of 4.2 V to 3.0 V was repeated 200 times in an environment of 30° C. at a charge current value of 1.0 mA/cm² and a discharge current value of 1.0 mA/cm².

Next, a vibration test (RMS 27.8 m/sec², maximum frequency: 2000 Hz) described in the column "Vibration" IEC62660-3 was performed to observe the battery state.

<Evaluation Standards>

A: the number of defective batteries among 10 all-solid state secondary batteries was 0 or 1
B: the number of defective batteries among 10 all-solid state secondary batteries was 2 or 3
C: the number of defective batteries among 10 all-solid state secondary batteries was 4 or 5
D: the number of defective batteries among 10 all-solid state secondary batteries was 6 or 7
E: the number of defective batteries among 10 all-solid state secondary batteries was 8 or more.

Being defective in the vibration test represents that short-circuit or heat generation of 10° C. or higher was observed in the battery.

The result of the respective tests will be below.

TABLE 3

| | Binder | | Ratio of Content of Binder a1 to Total Content of Binder a1 and Binder a2 in Sub-Layer of Primer Layer | Battery Characteristics | | | |
|---|---|---|---|---|---|---|---|
| | a1 | a2 | | Electrode Binding Properties | Discharge Load Characteristics | Cycle Characteristics | Vibration Resistance |
| Example 1-1 | PVDF-HFP | SBR | B1 > B2 > B3 > B4 > B5 > B6 | A | B | A | A |
| Example 1-2 | PVDF-HFP | SBR | B1 > B2 > B3 > B4 > B5 = B6 | A | B | A | A |
| Example 1-3 | PVDF-HFP | SBR | B1 > B5 > B4 > B3 > B2 > B6 | B | B | B | B |
| Comparative Example 1-1 | PVDF-HFP | SBR | Not Including Binder a1 | C | C | B | E |
| Comparative Example 1-2 | PVDF-HFP | SBR | B1 = B2 = B3 = B4 = B5 = B6 | D | C | B | E |
| Example 2-1 | Acrylic Latex | SBR | B1 > B2 > B3 > B4 > B5 > B6 | A | A | A | A |
| Example 2-2 | Acrylic Latex | SBR | B1 > B2 > B3 > B4 > B5 = B6 | A | A | A | A |
| Example 2-3 | Acrylic Latex | SBR | B1 > B2 > B3 > B4 > B5 > B6 | B | B | A | B |
| Comparative Example 2-1 | Acrylic Latex | SBR | Not Including Binder a1 | D | B | B | E |
| Comparative Example 2-2 | Acrylic Latex | SBR | B1 = B2 = B3 = B4 = B5 = B6 | C | B | B | E |

In the results of Table 3, in a case where the primer layer did not include the binder a1, the results in the vibration test were significantly poor (Comparative Examples 1-1 and 2-1). In addition, in a case where the primer layer included the binder a1 but the contents of the binders a1 in the respective sub-layers were the same, the results in the vibration test were also significantly poor (Comparative Examples 1-2 and 2-2).

On the other hand, in the all-solid state secondary batteries satisfying the regulations of the present invention, electrode binding properties were excellent, and all the results for discharge load characteristics, cycle characteristics, and vibration resistance were excellent (Examples 1-1 to 1-3 and 2-1 to 2-3).

The present invention has been described using the embodiments. However, unless specified otherwise, any of the details of the above description is not intended to limit the present invention and can be construed in a broad sense within a range not departing from the concept and scope of the present invention disclosed in the accompanying claims.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery

What is claimed is:

1. An electrode sheet for an all-solid state secondary battery comprising a current collector, a primer layer, and an electrode active material layer in this order,
   wherein the electrode active material layer includes an inorganic solid electrolyte having ion conductivity of a metal belonging to Group 1 or Group 2 in the periodic table, an active material, and a binder a1,
   the primer layer includes the binder a1 and a binder a2 different from the binder a1, and
   in a case where the primer layer is equally divided into six sub-layers in a thickness direction and the six sub-layers are set as a first sub-layer to a sixth sub-layer in order from the electrode active material layer side toward the current collector side, a relationship between a ratio B1 of a content of the binder a1 to a total content of the binder a1 and the binder a2 in the first sub-layer and a ratio B6 of a content of the binder a1 to a total content of the binder a1 and the binder a2 in the sixth sub-layer satisfies B1>B6.

2. The electrode sheet for an all-solid state secondary battery according to claim 1,
   wherein a ratio of a content of the binder a1 to a total content of the binder a1 and the binder a2 in each of the sub-layers increases in a direction from the second sub-layer toward the first sub-layer.

3. The electrode sheet for an all-solid state secondary battery according to claim 2,
   wherein a ratio of a content of the binder a1 to a total content of the binder a1 and the binder a2 in each of the sub-layers sequentially increases in a direction from the third sub-layer toward the first sub-layer.

4. The electrode sheet for an all-solid state secondary battery according to claim 1,
   wherein a resin forming the binder a1 is a polyamide resin, a polyimide resin, a polyurea resin, a fluorine-containing resin, a hydrocarbon resin, a polyurethane resin, or a (meth)acrylic resin.

5. The electrode sheet for an all-solid state secondary battery according to claim 4,
   wherein the binder a2 is a hydrocarbon resin or a hydrocarbon rubber.

6. The electrode sheet for an all-solid state secondary battery according to claim 1,
   wherein a resin forming the binder a1 has at least one of an acidic functional group, a basic functional group, a hydroxy group, a cyano group, an alkoxysilyl group, an aryl group, a heteroaryl group, or a hydrocarbon ring group in which three or more rings are fused.

7. The electrode sheet for an all-solid state secondary battery according to claim 1,
   wherein the binder a1 is formed of resin particles having a particle size of 1 nm to 10 μm.

8. The electrode sheet for an all-solid state secondary battery according to claim 1,
   wherein the electrode active material layer is a positive electrode active material layer.

9. The electrode sheet for an all-solid state secondary battery according to claim 1,
   wherein the inorganic solid electrolyte is a sulfide-based inorganic solid electrolyte.

10. An all-solid state secondary battery comprising:
   the electrode sheet for an all-solid state secondary battery according to claim 1.

* * * * *